UNITED STATES PATENT OFFICE.

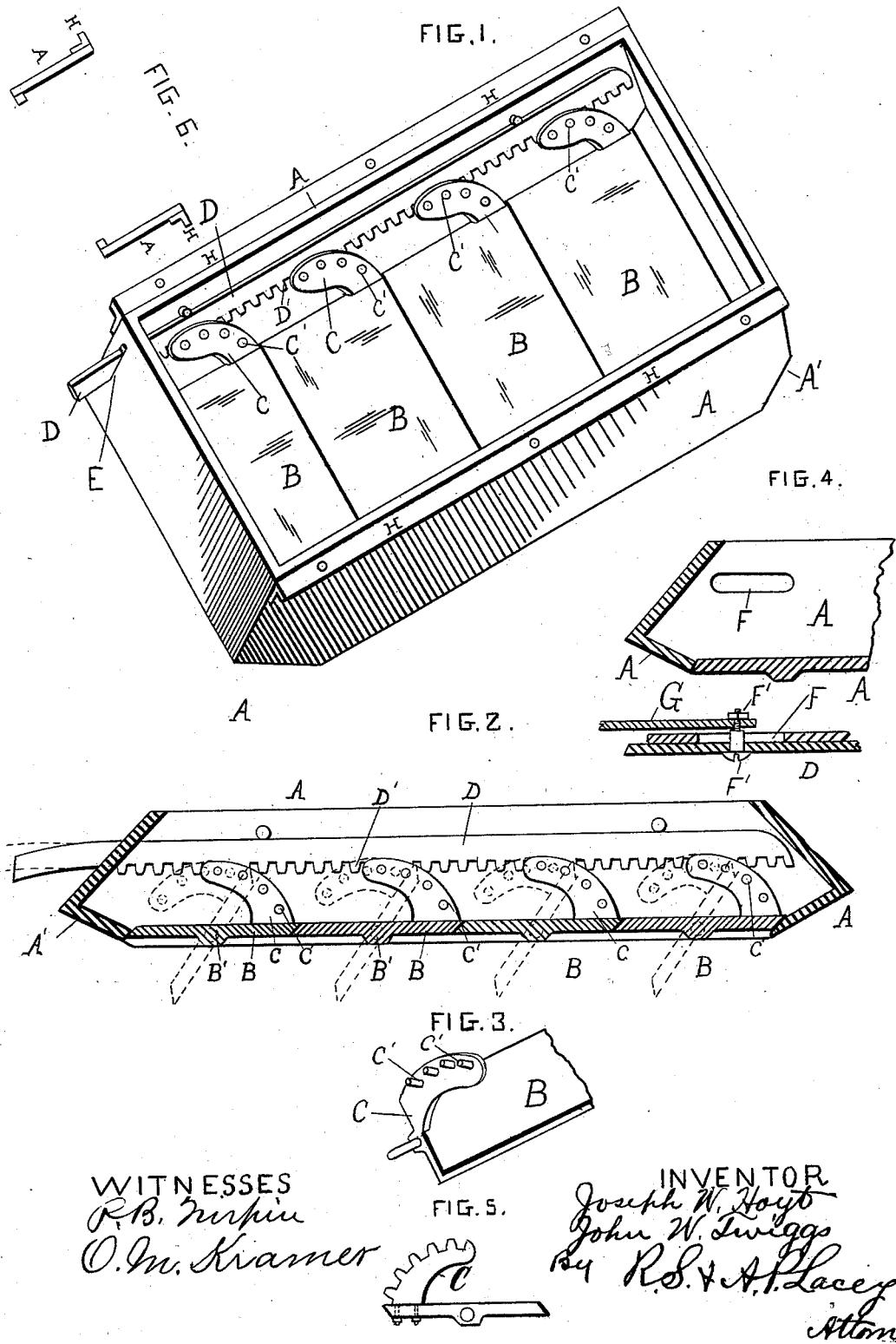

JOSEPH W. HOYT AND JOHN WESTLEY TWIGGS, OF JACKSON, MICHIGAN, ASSIGNORS OF ONE-THIRD TO DERRICK O. DYER, OF SAME PLACE.

LOCOMOTIVE ASH-PAN.

SPECIFICATION forming part of Letters Patent No. 296,964, dated April 15, 1884.

Application filed December 6, 1883. (No model.)

*To all whom it may concern:*

Be it known that we, JOSEPH W. HOYT and JOHN W. TWIGGS, citizens of the United States, residing at Jackson, in the county of Jackson and State of Michigan, have invented certain new and useful Improvements in Locomotive Ash-Pans, of which the following is a specification, reference being had therein to the accompanying drawings.

Our invention relates to improvements in locomotive ash-pans; and it consists in the improvements hereinafter described and claimed.

In the drawings, Figure 1 is a perspective view of the pan. Fig. 2 is a vertical longitudinal section of same. Fig. 3 is a detail view of one of the slats or sections. Fig. 4 shows in detail an external slat-operating rod. Fig. 5 is a detail view of a slightly modified form of curved rack, as will be hereinafter described and claimed; and Fig. 6 is a detail view illustrating the flanges whereby the ash-pan is secured to the furnace.

The pan A has the lower portion of its end plates, A', extended inward toward each other, and the inner edges of the said portion are inclined rearwardly, as most clearly shown in Fig. 2. In practice, we prefer to provide this pan with the flanges H H, as shown in Fig. 1. These flanges it will be understood serve to facilitate the securing of the pan to the furnace, the fastening-bolts being passed through the openings in the flanges, as will be readily understood on reference to the drawings. The slats or sections B are pivoted at B' in the lower end of the pan, and have their opposite edges beveled rearwardly with reference to their tilting motion, and the meeting-edges of the adjacent slats fit closely together. The edges of the forward and rear slats fit closely the bevel on the edge of portion A' of the pan. On one side of the slat I mount the plate C, which is provided with a series of pins, C', which form a rack whereby the slats are tilted in the manner presently described. These pins are arranged in the arc of a circle struck from the pivot of the slats, and are set below the edge of the plate C. The portion of the plate projecting above said pins or teeth serves as a guide or support for the operating rack-bar. For this reason we prefer to form the teeth as described. However, it will be understood that, where so desired, the teeth could be formed on the edge of plate C. In such case the rack-bar, hereinafter described, could be suitably supported in position to mesh with said teeth, as will be readily understood. The rack D is provided on its lower edge with teeth D', and has its rear end passed through a slot, E, formed in the end of the ash-pan. The teeth D' mesh with teeth C', and the rack is held in position by the portion of plate C projected above teeth C', operating in connection with pins E' E', projected inward from the side of the ash-pan. It will be seen that as the rack D is moved the slats will be tilted, as indicated, and the ashes dumped. The bar D might be extended through slot E to the rear of the pan and connected to the lower end of a lever, the handle end of which extends into the cab of the locomotive. We prefer, however, to connect the operating-lever to the rack-bar D in the manner shown in Fig. 4. In this figure the pan is shown as provided with slot F. A pin or stud, F', extends from bar D through this slot F, and is secured by nut or otherwise to the forward end of the bar or link G, to which is connected the lower end of the operating-lever.

By the construction specified it will be seen the slats may be tilted and the ashes dumped at any time, whether the engine be standing or in motion; also, that the slats may be tilted to any suitable angle, thereby enabling a slight tilting thereof, in order to assist the draft of the furnace.

By beveling the slats in the manner described the meeting-edges will fit snugly together and prevent the dropping of ashes, when so desired, as in crossing bridges, &c. The beveling of the edges also provides no shoulders or seats on which the ashes may get caught when the slats are elevated, and which would hold them from fitting snugly together when closed.

It will be seen that the angle at which the slat is beveled is the same on both its edges. By this construction the slat may be reversed or inverted. This would involve the changing of the plate C from one to the other side, which could be readily accomplished in case the said plate is detachably secured to the slats—for instance, by nuts and bolts, as shown in Fig. 5—instead of being cast integral therewith, as shown in the other figures. This reversibility is desirable for the reason that when one side is burned rough and becomes clinker-bound, so that the ashes will not readily slide thereoff when it is tilted, the slat may be inverted, as before described, and will give results equal to a new slat. By thus reversing the slats, they may be made to wear with good results twice as long as the ordinary non-reversible slats.

Having thus described our invention, what we claim, and desire to secure by Letters Patent, is—

1. In an ash-pan, the combination of the pan, the pivoted bottom slats or sections provided with a rack curved on an arc struck from their pivots, and the rack-bar suitably supported in position to engage said curved racks and movable longitudinally, substantially as set forth.

2. In an ash-pan, the combination, with the pan and the pivoted bottom slats or sections provided with a plate projected vertically from one end, of the rack-teeth projected laterally from the said plate below its upper edge and arranged in the arc of a circle, and the rack-bar suitably supported in position to engage the rack-teeth, substantially as and for the purposes specified.

3. In a locomotive ash-pan, the herein-described slats or sections pivoted in the pan, and having the forward and rear edges beveled rearwardly from their upper to their lower sides, said bevels being formed in similar angles on the opposite edges, whereby the slats may be reversed and extended the full length of said slats, substantially as described, whereby the joint between the adjacent slats is formed in a continuous inclined plane, substantially as and for the purposes specified.

4. The ash-pan, substantially as hereinbefore described, composed of the pan having a slot formed in one side, the slats pivoted in the pan and provided with curved racks, the rack-bar secured within the pan and meshed with the curved racks, the pin or stud having one end secured to the rack-bar and its opposite end projected through the slot F, and the link arranged outside the pan and secured to the pin or stud, substantially as and for the purposes set forth.

In testimony whereof we affix our signatures in presence of two witnesses.

JOSEPH W. HOYT.
JNO. WESTLEY TWIGGS.

Witnesses:
DERRICK O. DYER,
BENSON J. WOOD.